Dec. 25, 1934.   G. E. CRAIG ET AL   1,985,719
MOTOR CONTROL SYSTEM FOR GRINDERS AND THE LIKE
Filed Oct. 6, 1932
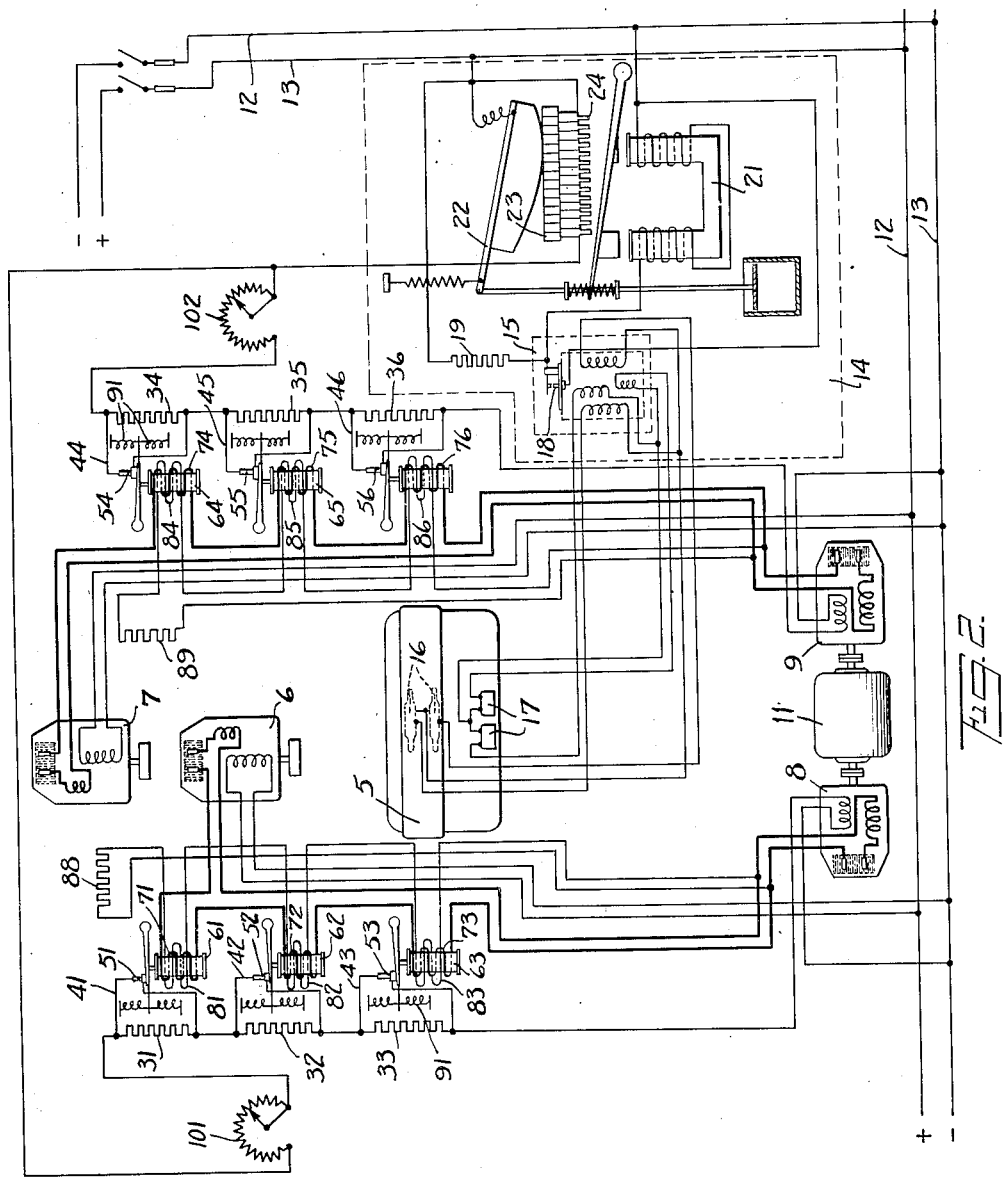
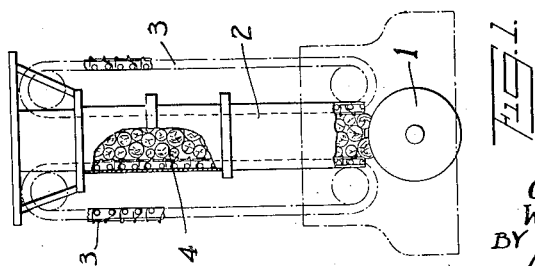
INVENTORS
George Edward Craig
William Jeston Walker
BY
ATTORNEY Patented Dec. 25, 1934

1,985,719

UNITED STATES PATENT OFFICE 1,985,719

MOTOR CONTROL SYSTEM FOR GRINDERS AND THE LIKE

George Edward Craig, Ottawa, Ontario, and William Jeston Walker, Gatineau, Quebec, Canada, assignors to International Paper Company, New York, N. Y., a corporation of New York Application October 6, 1932, Serial No. 636,504

8 Claims. (Cl. 172—239)

Our invention relates to automatic control systems for electric motors such as those employed in so-called continuous woodpulp grinders and the like.

In such plants it is common to drive a pair of grinders by means of a single drive motor and to supply wood to the stones through pockets or magazines having feed devices such as continuous chains, the latter being driven by electric motors.

It is highly desirable to provide regulating means for maintaining a substantially constant load on the drive motor and also to protect against irregularities of operation of the individual grinders and the motors appertaining thereto. Dulling of one of the stones, for example, will tend to cause the pressure exerted by the corresponding feeding device to increase and this pressure may actually increase until it causes the stone to break.

The stones may also become slippery due to an excess of water or due to an overglazing resulting from an insufficiency of water at the grinding surface. Jamming of the wood in the magazine constitutes a further source of irregularity.

It is therefore an object of our present invention to provide means for controlling electric motors such as those used for the purpose described, to compensate for inequalities and irregularities of operation of the grindstones and to avoid excessive pressure on the stones and other disadvantages encountered in the prior art.

A further object of our invention is to provide means of the character indicated which shall be effective to regulate the operation of a plurality of feed motors independently of each other in accordance with conditions in the feed device or at the grinding surface and also to provide simultaneous regulation of the feed motors in accordance with the load taken by the main driving motor.

Our invention has for further objects such other operative advantages and improvements as may hereinafter be found to obtain.

Our invention contemplates the provision, in a system of the character indicated, of resistances located in the field circuits of the generators supplying power to the feed motors, which resistances are provided with individual shunt circuits having normally closed switches. These switches are actuated by relays which are responsive to characteristics of the armature circuits of the feed motors, and operate independently to increase the resistance in the field circuits of the individual generators when predetermined characteristics of the feed motor armature circuits are attained.

Preferably we provide a plurality of individual resistances located in series in the field circuit of each of the generators. The several shunt switches of these resistances are operated by a corresponding plurality of relays having actuating coils located in the armature circuit of the corresponding feed motor. The actuating coils of the relays may be made responsive to the current intensity or the potential or preferably both in the armature circuits of the feed motors. Preferably the relays are so set as to operate at successive increasing values so that a given tendency toward change in the characteristics of the armature circuits of the feed motors ordinarily affects the operation of the corresponding plurality of relays in a successive or step-by-step manner.

We further provide regulable means for biasing the relay operating switches, for use in adjusting the operation of the latter to predetermined values.

Our invention is especially adapted to be employed in association with means for regulating the input to the main driving motor, for example, regulating means of the so-called wattmeter type. A regulating device of this character is adapted to vary additional resistance in the field circuits of the field motor generators but will not alone affect individual regulation of the respective feed motors.

While such regulating apparatus has been used alone in the past it has not proved satisfactory due to certain inherent disadvantages such, for example, as its inability to accomplish individual and independent regulation of the feed motors as well as other inherent disadvantages which will be referred to hereinbelow and which it is one of the objects of our invention to overcome.

In order that our invention may be clearly set forth and understood, I now describe, with reference to the accompanying drawing, a preferred manner in which it may be embodied. In this drawing, Fig. 1 is a somewhat diagrammatic view of a continuous feed device for a grindstone; and Fig. 2 is a wiring diagram showing a main driving motor, a pair of feed motors associated therewith, generators for the latter, and regulating devices for the feed motors and the generators, in accordance with our present invention.

As shown in Fig. 1, a grindstone 1 is provided with a feed magazine 2 having feed devices comprising a plurality of endless chains 3 the surfaces of which are such as to effect, upon movement of the chains 3, a generally corresponding movement of the wood 4 within the magazine 2. By suitably rotating the endless chains 3, wood fed into the magazine 2 may be forced downward against the rotating grindstone 1.

As mentioned hereinabove it is usual to drive a pair of the grindstones 1 in common and for this purpose we provide a drive motor 5 illustrated in Fig. 2. For the purpose of operating the chains 3 of the feeding device of one of the grindstones 1 we provide a feed motor 6 and for the purpose of operating the feed device of the other grindstone 1 we provide a feed motor 7. The armature circuits of the feed motors 6 and 7 are energized by electric current supplied from a corresponding pair of generators 8 and 9 respectively. The generators 8 and 9 are suitably driven as, for example, by means of an induction motor 11 the supply lines of which are not shown. The field circuits of the motors 6 and 7 and the generators 8 and 9 are excited from a separate source of electrical energy through lines 12 and 13.

As mentioned hereinabove, we provide a device for regulating the load on the main driving motor, which device in the present instance comprises a regulator of the so-called wattmeter type as illustrated at 14 in Fig. 2. This device comprises in part a contact-making wattmeter 15 supplied with power from current transformers 16 and potential transformers 17 associated with the main driving motor 5.

The wattmeter 15, by means of a contact 18 and a resistance 19, is adapted to vary the current delivered to a solenoid device 21 in accordance with the power input to the driving motor 5. A variation in the current passing through the coils of the solenoid device 21 effects a corresponding variation in the position of a rocking contact 22, which by moving over a series of contacts 23 is in turn effective to insert a larger or smaller portion of a resistance 24 into the field circuits of the generators 8 and 9.

The device 14 is so constituted that when the power input to the grinder drive motor 5 decreases below a predetermined point, the amount of the resistance 24 which is effective in the field circuits of the generators 8 and 9 also decreases and the voltages applied to the feed motors 6 and 7 are caused to rise in unison. Conversely, if the power input to the grinder drive motor 5 increases, the voltages applied to the feed motors 6 and 7 are reduced. Such regulation as is accomplished by means of the device 14 alone, however, affects the motors 6 and 7 alike and does not in itself provide for independent regulation of the motors 6 and 7 and the feed devices operated thereby.

As mentioned hereinabove, we provide independent resistance in the field circuits of the generators 8 and 9. In the instance illustrated in Fig. 2, the field circuit of the generator 8 is provided with a plurality of three resistances 31, 32 and 33 located in series, while the field circuit of the generator 9 is provided with a similar plurality of resistances 34, 35 and 36. The resistances 31 to 36 are provided with individual shunt circuits 41 to 46, respectively, having a corresponding plurality of normally closed switches 51 to 56, which are in turn adapted to be operated by a corresponding plurality of relays 61 to 66.

The relays 61 to 63 inclusive are provided with actuating coils 71 to 73 located in the main armature circuit of the feed motor 6 and responsive to the current intensity in said circuit, while the relays 64 to 66 inclusive are provided with actuating coils 74 to 76, respectively, which are similarly located in the armature circuit of the feed motor 7.

Preferably we also provide the relays 61 to 66 with potential coils 81 to 86, respectively, the coils 81 to 83 being located in a circuit parallel to the armature circuit of the feed motor 6, which parallel circuit also contains a suitably high resistance 88, while the potential coils 84 to 86 are similarly located with respect to the armature circuit of the feed motor 7 and are in series with a resistance 89.

Each of the switches 51 to 56 is provided with regulating springs 91 whereby the operation of each of the switches by means of its corresponding relay may be adjusted to predetermined values within the limits made possible by the windings of the several relays. The switches 51 to 56 may also be provided with further means of adjustment (not shown) whereby the stationary core of the relays may be raised or lowered, changing the air gap of the magnetic path and consequently the strength of pull of the moving core, by means of an adjusting screw or the like.

We further provide means for manually regulating the operation of the generators 8 and 9, which means may comprise variable field rheostats 101 and 102 located in the field circuits of the generators 8 and 9, respectively, as shown.

The manner in which our device operates to accomplish the desired regulation may best be understood with reference to typical conditions which may arise in actual practice, and by comparison with the results achieved by a wattmeter type regulator, which, if employed alone would be unable to effect independent regulation of the individual feed motors.

As is to be expected, the grindstones 1 are subjected to considerable wear, the effect of which is to dull the grinding surface of the stones. This dulling effect rarely takes place uniformly with respect to both stones of a pair operated by a single driving motor and gives rise to certain irregularities of operation which it is a purpose of our present invention to overcome.

Thus, if one of the grindstones 1 dulls considerably while the other stone 1 remains relatively sharp, the wood being fed to the dull stone naturally tends to be ground away at a slower rate, and unless some provision is made for reducing the speed of the feeding device this in turn causes the pressure exerted by the feeding device upon the stone to increase materially and may even cause the stone to break, besides placing a useless friction load upon the drive motor and increasing the power required per unit of ground-wood produced.

The result of the increased pressure exerted by the feeding device upon the dull stone may be to increase the total power input to the driving motor 5 due to the increase of the friction load upon the dull stone. When this occurs, the tendency of the device 14, which responds to the increase in the power input to the driving motor 5 is to cause more of the resistance 24 to be inserted in the field circuits of both of the generators 8 and 9 and consequently to reduce the applied voltage in the armature circuits of both of the feed motors 6 and 7.

The effect of this reduction of applied voltage to the feed motor operating the feeding device supplying the sharp stone is to cause the sharp stone to drop load and to cause the corresponding feeding device to operate at a slower speed so that the pressure applied by the feeding device to the sharp stone falls. It may be noted that with some types of grindstones it requires only very little reduction of pressure to cause the output of the stone in ground pulp to fall off considerably.

With respect to the dull stone, it would ordinarily be expected that the reduction of the required voltage to the corresponding feed motor which is effected by the device 14 would be to reduce the pressure exerted by the corresponding feeding device upon the dull stone. But in our experience we have observed that although the voltage does decrease as the stone dulls, nevertheless the amperage in the armature circuit of the corresponding feed motor tends to increase out of all proportion to the drop in voltage, so that the pressure exerted by the feeding device on the dull stone often increases from 300 to 400 per cent, thus endangering the stone and giving rise to the other disadvantages recited hereinabove.

It may happen that as one stone becomes dull the total power input to the drive motor 5 remains substantially constant or may even decrease. In this event, the device 14 operates to maintain the applied voltage to the feed motors substantially constant or to increase the required voltage. So far as the sharp stone is concerned, this is not disadvantageous, for it results in maintaining or even increasing the load carried by the sharp stone, but the effect exerted upon the dull stone is extremely undesirable for the reason that the applied voltage to the corresponding feed motor is maintained substantially constant or even increased while the amperage in the armature circuit of the feed motor increases materially. The effect of this is to greatly increase the possibility of breaking the dull stone.

It will thus be apparent that the operation of the device 14 alone leaves considerable room for improvement due principally to the fact that independent control of the feed motors cannot be accomplished, which is necessary for a higher degree of flexibility and fineness of control when either one or a plurality of feed motors is being employed to supply load to the driving motor and which is also a highly desirable feature in view of the fact that in actual practice the grinding conditions of the two stones rarely if ever remain similar over any considerable period of time.

According to our invention, however, any necessary change of voltage to either of the feed motors is accomplished without interfering with the regulation of the other feed motor.

If it is assumed, for example, that the stone corresponding to the feed device driven by the motor 7 becomes dull while the other grindstone remains sharp, the consequent increase in current intensity or amperage in the armature circuit in the feed motor 7 operates through one or more of the relays 64, 65 and 66 to throw one or more of the resistances 34, 35 and 36 into the field circuit of the corresponding generator 9, thus reducing the applied voltage to the feed motor 7 and in turn reducing the pressure exerted by the corresponding feed device against the stone fed thereby. In this manner the dull stone is protected and can run for a longer time than would otherwise be possible without sharpening, which in turn reduces the cost of producing a unit amount of the finished material.

By way of specific example, the relays 64, 65 and 66 may be adjusted to cause the corresponding switches 54, 55 and 56 to open at current intensities of 12, 15 and 20 amperes, respectively, and the resistances 34, 35 and 36 which may thus be successively thrown into the field circuit of the generator 9 may have resistances of 100, 225 and 500 ohms, respectively. In this specific instance the maximum voltage which the generator 9 is capable of supplying is 80 volts and the normal amperage under optimum operating conditions is below 12.

When the current intensity in the armature circuit of the feed motor 7 which corresponds to the dull stone increases to 12 amperes the resistance 34 of 100 ohms is placed in the field circuit of the generator 9, thus reducing the applied voltage to the feed motor 7. If the current intensity continues to rise the relays 65 and 66 operate successively to throw the resistances 35 and 36 of 225 ohms and 500 ohms, respectively, into the field circuit of the generator 9.

In this manner the applied voltage of the feed motor 7 is reduced, with constant reduction in pressure exerted by the corresponding feed device upon the dull stone and without affecting the operation of the sharp stone.

As a matter of fact, the voltage applied to the armature circuit of the feed motor 6 corresponding to the sharp stone remains at its full value and may even be increased by the device 14, if the effect of the dulling of the other stone is to reduce the load upon the driving motor 5.

It will therefore be apparent that an advantage of our present invention is that the maximum applied voltages to the feed motors 6 and 7 may be higher than were heretofore possible, due to the protection given a dulling stone by our device, and furthermore this high maximum permissible applied voltage enables the sharp stone to carry a much higher load, which in turn increases the rate of production and reduces the power required per ton of finished material.

In the description immediately above, the operation of the relays 64, 65 and 66 has been described with reference to the effect of current coils 74, 75 and 76 and without reference to the effect of the potential coils 84, 85 and 86. While with some types of compound wound feed motor generators the relays 61 to 66 require only current coils, with other types of compound wound feed motor generators and with all shunt wound generators, both current and potential coils are highly desirable.

Consequently, we prefer to supply the relays 61 to 66 with potential coils 81 to 86, respectively, which coils are responsive to the voltage applied to the armature circuits of the feed motors 6 and 7, in order to prevent the combined effect of the resistances 31 to 36 or some of them, together with the effect of the resistance 24 operated by the device 14, from reducing the applied voltage to either of the feed motors 6 or 7 to such a point as to cause the feed motor to stall.

In the arrangement shown in the drawing, in which both current coils and potential coil are employed, the necessary flux to operate the switches 51 to 56 depends upon both the potential and the current intensity in the armature circuits of feed motors 6 and 7.

Thus, in this specific instance the relays 61 and 64 may be so constituted as to open the switches 51 and 54 respectively at 12 amperes and from 60 to 75 volts in the armature circuit of the feed motors 6 and 7, respectively. The switches 51 and 54 then remain open until the voltage falls to 60, the amperage still being 12, and at this point the switches 51 and 54 are set to close, thus removing the resistances 31 to 34 from the field circuits of the generators 8 and 9, respectively.

Similarly, the relays 62 and 65 may be so constituted as to open the corresponding switches 52 and 55 at 15 amperes and 60 volts and to permit the switches 52 and 55 to close again at 15 amperes and 45 volts, while the relays 63 and 66 may be so constituted as to cause the switches 53 and 56 to open at 20 amperes and 45 volts and to cause the switches 53 and 56 to close when the voltage applied to the feed motors 6 and 7 falls to below 25 volts.

When dulling of one of the stones causes the amperage in the circuit of the corresponding feed motor, for example the feed motor 6, to rise to 12 amperes, the voltage being around 75, the switch 51 opens, introducing the resistance 31 into the field circuit of the generator 8 and lowering the feed motor voltage. The effect of this may be to cause the amperage to decrease, thereby causing the relay 61 to close the switch 51 again, thereby raising the feed motor voltage. In actual operation, only the first coil 61 will operate for some time, the switch 51 alternately opening and closing, and the feed motor voltage slowly varying between rather narrow limits.

Eventually, however, further dulling of the stone causes the current to rise to from 12 to 14 amperes, the voltage being about 60, and the switch 51 then remains open.

Further dulling of the stone may then cause the amperage to rise to 15, and at that point, with a voltage of 60, the coil 62 operates to open the switch 52, introducing the resistance 32 into the circuit and reducing the voltage to some point between 45 and 60. Now for some time, the coil 62 will alternately open and close the switch 52 as the current varies around 15 amperes and slightly below 60 volts.

It is often found that as the current varies around 15 amperes, both coils 61 and 62 will be operating more or less together, their operation thus overlapping.

When still further dulling of the stone causes the current to rise to from 15 to 20 amperes and remain there, the voltage being about 45, the coil 61 will close the switch 51 and the coil 62 will open the switch 52. When the current reaches 20 amperes, the coil 63 will then cause the switch 53 to open, and for a time the switch 53 will alternately open and close, varying the voltage above and below 45 volts.

As the current falls below 20 amperes and the voltage rises above 45 volts, the coil 62 opens the switch 52, closing it again when the voltage falls far below 45 volts in spite of the increase in amperage. Thus, around 20 amperes and 45 volts, both switches 52 and 53 are operating and overlapping. This overlapping gives a very desirable smoothness of operation and voltage change.

When the stone becomes very dull and the current rises to above 20 amperes and remains there, the coil 63 causes the switch 53 to remain open, and the voltage falls to 25 volts. At this point the coil 62 causes the switch 52 to close, taking the resistance 32 out of the circuit and tending to prevent any further reduction of voltage, with consequent stalling of the motor 6.

The operation of the coils 64, 65 and 66 is similar to that of the coils 61, 62 and 63, but independent thereof.

If the device 14 causes the voltage applied to one of the feed motors 6 and 7 to fall to below 25 volts, the corresponding relay 63 or 66, as the case might be, would cause the corresponding switch 53 or 56 to close, thus cutting one of the 500 ohm resistances 33 or 36 out of the field circuit of the corresponding generator 8 or 9. The effect of this is to prevent the voltage applied to either of the feed motors 6 or 7 from falling below 25 volts, and the device thus operates to prevent stalling of either one of the feed motors 6 or 7.

Another condition which sometimes arises and causes irregularities of operation is undue slipperiness of the grindstone. This condition may arise from the presence of too much water at the grinding surface or, on the other hand, from a lack of sufficient water, which causes the surface of the stone to become glazed over. In either event, the grinding accomplished by the stone falls off materially and the power input to the driving motor 5 decreases.

The tendency of the device 14 at such time is to increase the applied voltage to the feed motor 6 or 7 corresponding to the stone so affected. At the same time the current intensity or amperage in the armature circuit of the affected feed motor also increases so that the pressure exerted by the feeding device upon the stone is very materially increased and the stone is subjected to an even greater pressure than would be true if the stone were very dull but still doing some grinding work.

According to our invention, however, this tendency of the device 14 is reduced or counteracted by the fact that the increasing amperage in the armature circuit of the affected feed motor acts through one or more of the relays 61 to 66 to reduce the applied voltage to the corresponding feed motor, thus reducing the pressure applied by the feeding device and protecting the slippery stone against injury.

It sometimes happens that the wood may jam in one of the pockets or magazines 2. When this happens on one of the stones, the power input to the driving motor 5 decreases materially due to the reduction in the load carried by the affected stone. The tendency of the device 14 in this instance is consequently to increase the applied voltages of both of the feed motors 6 and 7, thus tending to put the entire kilowatt load on the other stone while the feed motor associated with the magazine affected by the jam tends to build up a very high amperage as the feeding device is unable to clear itself. Such high amperage causes the circuit to be interrupted due to the operation of circuit breakers in the feed motor armature circuit which are not shown, and this interruption of the current supplied to the feed motor and the consequent interruption of the feeding device makes it necessary to resharpen the stone before the jam can be cut through and eliminated.

According to our invention, however, the increase in the amperage in the armature circuit of the feed motor driving the affected feeding magazine operates through one or more of the relays 61 to 66 to decrease the voltage applied to the feed motor. The result of this is that the corresponding feeding device is slowed down, the pressure on the jam is reduced and the jam tends to work off easily instead of being made worse by increased pressure. During this time the production of the other stone is not interfered with.

It will be apparent from the above that some of the important advantages of our invention are as follows:

1. Regulation of the feeding device for each of a pair of grindstones is accomplished independently of the operation of the other stone, variation in the operation of one of the grindstones not tending to cause variation in the operation or regulation of the feed motor for the other grindstone.

2. Our device operates to protect the grindstones against excessive pressure resulting from dulling of one of the stones or a slippery condition of the grinding surface of one of the stones, with consequent freedom from excessive friction losses, a tendency toward breakage of the stone and high power consumption per unit quantity production.

3. It is possible for the grindstones to be run for a considerably longer time without re-sharpening, which results in a reduction of the labor cost for re-sharpening. It also makes it possible to operate the grindstones dull enough to produce an extra fine quality of pulp without danger of breakage of the stones.

4. It is possible to operate the feed motors at higher voltages, thus increasing the production of the unit.

5. Our device greatly reduces the tendency for the feeding device to work into serious jams.

6. Our device assists in maintaining a steady uniform load on the main driving motor for the grindstones.

7. The cost of maintenance of our device is low, especially since the current passing through the switches 51 to 56 is of low intensity and voltage.

8. Our device is inexpensive to install and materially increases the capacity and performance of the entire unit.

9. The device of our invention operates to prevent interruption of the current supply to the feed motors due to excessive amperage and also to prevent stalling of the motors due to undue reduction of the applied voltages thereto.

It will be apparent to those skilled in the art that our invention is susceptible of considerable modification in detail. For example, the feeding device for the magazines 2 may comprise worm wheels or the like in place of continuous chains, and numerous specific changes may be made in portions of the electrical circuits described without departing from the teaching of our invention.

Our invention is therefore not limited to the specific example or examples illustrated and described hereinabove by way of example, but is to be broadly construed as of the scope of the claims hereinafter made.

What is claimed is:

1. A motor control system comprising a motor, a generator supplying said motor, means responsive to the motor current for decreasing the generator voltage, means preventing such decrease when the generator voltage is below a predetermined value, said last named means also acting to limit the generator voltage to a predetermined maximum.

2. A motor control system comprising a motor, a generator supplying said motor, a plurality of resistances in the field circuit of said generator, each of said resistances being short circuited by an individual switch, means for operating said switch in response to a predetermined value of motor current and means to prevent the opening of each switch when the motor voltage is below a predetermined value.

3. A motor control system comprising a motor, a generator supplying said motor, a plurality of resistances in the field circuit of said generator, each of said resistances adapted to be short circuited by an individual switch; a relay to operate each of said switches, each relay having a coil responsive to the motor current and a coil responsive to the motor voltage, the opening of each switch requiring the cumulative effect of both of said coils.

4. A motor control system comprising a motor, a generator supplying said motor, a plurality of resistances in the field circuit of said generator, each of said resistances being adapted to be short circuited by an individual switch; a relay to operate each of said switches, each relay having a coil responsive to the motor current and a coil responsive to the motor voltage, the current and voltage coils being so balanced that the said switch will not open below a predetermined value of voltage.

5. In a motor control system comprising a main motor, a plurality of auxiliary motors for loading said main motor, means responsive to the load of said main motor for varying the voltage of said auxiliary motors, and means responsive to the mechanical load on each auxiliary motor for holding the power consumption thereof substantially constant.

6. In a motor control system for use in an automatically fed grinding machine having a drive motor, one or more stones driven thereby, and a feed motor for each stone, the combination which comprises: means responsive to the power taken by the driving motor for simultaneously regulating the voltage of each feed motor; and means independently responsive to the voltage and current of each feed motor for automatically regulating the voltage of such feed motor to maintain a substantially constant power input for all increments of load on said feed motor.

7. In a motor control system for use in an automatically fed grinding machine having a drive motor, one or more stones driven thereby, and a feed motor for each stone, the combination which comprises: means responsive to the power taken by the driving motor for simultaneously regulating the voltage of each feed motor; and a plurality of means independently responsive to the voltage and/or current of each feed motor for regulating the voltage of the respective feed motor to automatically maintain the power input substantially constant for each increment of load demand on the respective feed motor.

8. In a motor control system for use in an automatically fed grinding machine having a drive motor, one or more stones driven thereby, and a feed motor for each stone, the combination which comprises: means responsive to the power input to the drive motor for varying the voltage of each feed motor, and means responsive to both the voltage and current of each feed motor for automatically maintaining a substantially constant power input to the respective feed motor for such value of current taken by each feed motor.

GEORGE EDWARD CRAIG.
WILLIAM JESTON WALKER.